(12) United States Patent
Moon et al.

(10) Patent No.: US 9,368,801 B2
(45) Date of Patent: Jun. 14, 2016

(54) SPHERICAL, POROUS CARBON STRUCTURE AND A PRODUCTION METHOD THEREFOR

(75) Inventors: Jun Hyuk Moon, Seoul (KR); Chang-yeol Cho, Incheon (KR); Ji-hwan Kang, Seoul (KR); Woo Min Jin, Busan (KR); Juhwan Shin, Seoul (KR)

(73) Assignee: INDUSTRY-UNIVERSITY COOPERATION FOUNDATION SOGANG UNIVERSITY, Seoul (KR)

( * ) Notice: Subject to any disclaimer, the term of this patent is extended or adjusted under 35 U.S.C. 154(b) by 540 days.

(21) Appl. No.: 13/823,770

(22) PCT Filed: Dec. 9, 2010

(86) PCT No.: PCT/KR2010/008802
§ 371 (c)(1),
(2), (4) Date: May 31, 2013

(87) PCT Pub. No.: WO2012/036349
PCT Pub. Date: Mar. 22, 2012

(65) Prior Publication Data
US 2013/0273460 A1    Oct. 17, 2013

(30) Foreign Application Priority Data

Sep. 17, 2010  (KR) .................. 10-2010-0091782

(51) Int. Cl.
*H01M 4/02* (2006.01)
*H01M 4/86* (2006.01)
*C01B 31/02* (2006.01)
*H01M 4/62* (2006.01)
*H01M 4/90* (2006.01)
*H01M 4/92* (2006.01)

(52) U.S. Cl.
CPC ............. *H01M 4/8657* (2013.01); *C01B 31/02* (2013.01); *H01M 4/625* (2013.01); *H01M 4/9083* (2013.01); *H01M 4/926* (2013.01); *Y02E 60/50* (2013.01); *Y10T 428/2982* (2015.01)

(58) Field of Classification Search
CPC ............................. C01B 31/02; H01M 4/9083
USPC ........................................... 429/532; 502/185
See application file for complete search history.

(56) References Cited

U.S. PATENT DOCUMENTS 7,220,697 B2 *   5/2007   Pak et al. .................. 502/185

FOREIGN PATENT DOCUMENTS

| KR | 10-2001-0082910 A | 8/2001 |
| KR | 10-2003-0068765 A | 8/2003 |
| KR | 10-2005-0018200 A | 2/2005 |
| KR | 10-2005-0049153 A | 5/2005 |
| KR | 10-20050117112 A | 12/2005 |
| KR | 10-2009-0019339 A | 2/2009 |

OTHER PUBLICATIONS

International Search Report for PCT/KR2010/008802 dated Oct. 31, 2011.
Liang, et al., "Gold Nanoparticle-Based Core-Shell and Hollow Spheres and Ordered Assemblies Thereof", Max Planck Institute of Colloids and Interfaces, Germany, Chem. Mater, vol. 15, pp. 3176-3183, 2013.
Cho, et al., "Particles with Coordinated Patches or Windows from Oil-in-Water Emulsions", National Center for Integrated Optofluidic Systems and Depsartment of Chemical Biomolecular Engineering, Chem. Mater, vol. 19, pp. 3183-3193, 2007.
Xu, et al., "Ni Hollow Spheres as Catalysts for Methanol and Ethanol Electrooxidation", Department of Chemistry and Institute of Nanochemistry, Jinan University, ScienceDirect, Electrochemistry Communications 9 (2007) 2009-2012.

* cited by examiner

*Primary Examiner* — Edward Cain
(74) *Attorney, Agent, or Firm* — Brundidge & Stanger, P.C.

(57) ABSTRACT

The present application relates to a spherical, porous structure which is formed using a mold taking the form of a spherical nanoparticle aggregate, and relates to a production method therefor. According to one aspect of the present application, the production method for the spherical, porous structure comprises: the use of a mold taking the form of a spherical nanoparticle-carbon precursor aggregate comprising a carbon precursor on the surfaces of a plurality of nanoparticles, formed by removing solvent from droplets comprising the carbon precursor and the plurality of nanoparticles.

16 Claims, 10 Drawing Sheets

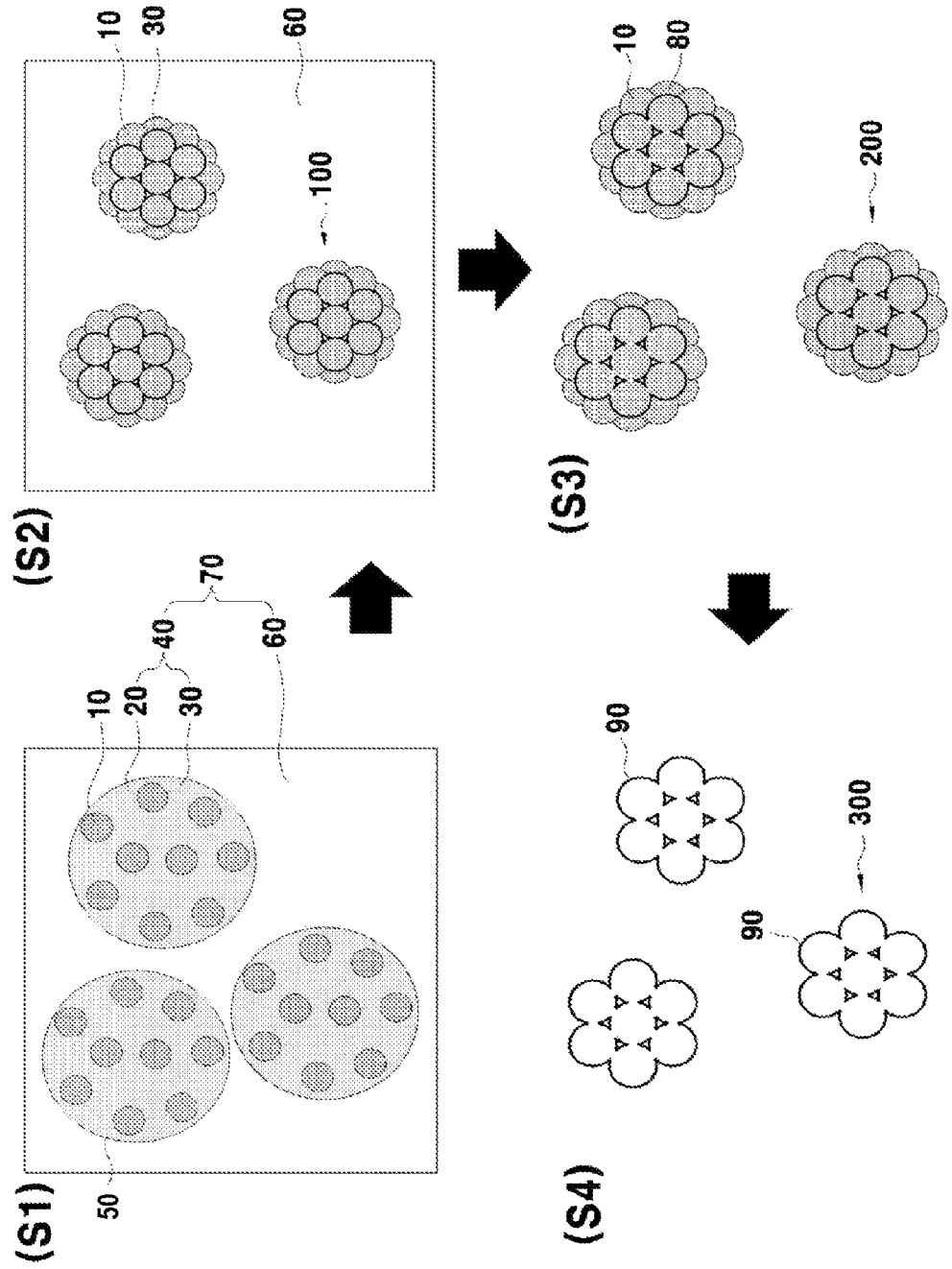

SPHERICAL, POROUS CARBON STRUCTURE AND A PRODUCTION METHOD THEREFOR

CROSS-REFERENCE TO RELATED APPLICATION

This application is a National Stage Application of International Application No. PCT/KR2010/008802 filed on Dec. 9, 2010, which claims the benefits of Korean Patent Application No. 10-2010-0091782 filed on Sep. 17, 2010. The entire disclosure of the prior application is incorporated herein by reference in its entirety.

TECHNICAL FIELD

The present disclosure relates to a spherical porous carbon structure produced by using a spherical nanoparticle-carbon precursor coaggregate as a template, a method for producing the same, and a use of the same.

BACKGROUND ART

Pores of a porous material or a porous structure can be classified into three regimes, namely, micropores (<2 nm), mesopores (2-50 nm), and macropores (>50 nm) depending on a diameter size of a pore. By controlling a pore size, a porous material can be used in various fields as a catalyst, a separation system, a low dielectric material, a hydrogen storage material, photonic crystals, an electrode, and the like. Thus, recently, it has attracted a lot of attention.

Such a porous material or structure may include a metallic oxide, an inorganic material such as a semiconductor, a metal, a polymer or a carbon. In particular, a porous structure including a semiconductive metallic oxide can be used in various ways for self-purification of air and water pollution by means of a photocatalytic reaction and a photoelectrochemical conversion, production of hydrogen for hydrogen fuel cells by means of water decomposition, and the like. In particular, due to surface characteristics, ion conductivity, corrosion resistance, and low cost of a porous carbon structure, various kinds and various forms of carbon materials have currently been used.

Conventionally, a template has been used to manufacture a porous carbon structure, and a colloidal crystalline array based on a coaggregate in which spherical silica or latex polymer nanoparticles are arranged has been used as the template. Further, M41S mesoporous silica arranged is manufactured by using a micelle array of a surfactant molecule as a structure-directing agent for silica polymerization. Although there have been efforts to synthesize regularly arranged porous carbon by a template duplication method using zeolite, a mesoporous material, and a colloidal crystal, pores are not regularly arranged in a structure of such carbon.

Porous carbon structures are different in efficiency depending on their structural characteristics including pore distribution, connectivity, a surface area, and surface characteristics. A surface area and a pore volume need to be adjusted appropriately for a purpose of use of a carbon structure. By way of example, when a carbon structure is used in an electrode of a fuel cell, the carbon structure having a large surface area and a large pore volume is used as a carrier, metallic catalyst particles to be carried have a small size and are uniformly distributed in the carbon carrier, so that an active surface area can be increased and fuel and a reaction product can be easily diffused. Thus, activity can be improved. Meanwhile, if the carbon structure has an extremely small pore size, a specific surface area is highly increased, so that the amount of the catalyst material carried can be increased but it becomes difficult to transfer and diffuse a reactant gas or the like and a polymer electrolyte cannot penetrate into micro pores. Thus, efficiency of the catalyst can be decreased and characteristics of the fuel cell cannot be improved.

However, a method for manufacturing a carbon structure in which pores have interconnectivity and various sizes and a method for efficiently manufacturing a porous carbon structure by easily controlling a pore size and a pore shape of the carbon structure have not been known. In particular, there has not been suggested a method for manufacturing a "spherical" carbon structure including pores having an inverse opal structure by "controlling a pore size and a pore shape" of the carbon structure.

Typically, various methods for synthesizing polymer particles have been well known as methods for manufacturing micrometer-sized particles. By way of example, polystyrene (PS) or polymethylmethacrylate (PMMA) particles can be manufactured to be several micrometer-sized particles by means of a polymerization method known as dispersion polymerization. If the particles have a micrometer size or a smaller size, the particles can be manufactured to be micrometer-sized particles by means of emulsion polymerization. Such micrometer-sized particles have been widely used as a monomer for preparing a colloid crystal. However, there is no alternative method for synthesizing a spherical porous carbon structure including uniform particles of "several micrometer size" as a porous carbon structure.

DISCLOSURE OF THE INVENTION

Problems to Be Solved by the Invention

In view of the foregoing, the present disclosure provides a production method of a spherical porous carbon structure including using a spherical nanoparticle-carbon precursor coaggregate as a template, a spherical porous carbon structure produced by the production method and including an inverse opal structure and a three-dimensional pore assembly, a spherical porous metallic catalyst body including the spherical porous carbon structure including metal, and a use of the spherical porous carbon structure.

However, problems to be solved by the present disclosure are to the above-described problems. Although not described herein, other problems to be solved by the present disclosure can be clearly understood by those skilled in the art from the following description.

Means for Solving the Problems

In accordance with a first aspect of the present disclosure, there may be provided a production method of a spherical porous carbon structure via a sacrificial template process. The production method includes: using a spherical nanoparticle-carbon precursor coaggregate as a template, wherein the nanoparticle-carbon precursor coaggregate is formed by removing a solvent from a droplet including plural nanoparticles and a carbon precursor, in which the spherical nanoparticle-carbon precursor coaggregate includes the carbon precursor on a surface of the plural nanoparticles.

In accordance with an illustrative embodiment, the production method of a spherical porous carbon structure may further include, but may not be limited to: forming a spherical nanoparticle-carbon coaggregate by calcining the spherical nanoparticle-carbon precursor coaggregate in a reducing atmosphere; and removing the plural nanoparticles included in the spherical nanoparticle-carbon coaggregate.

In accordance with an illustrative embodiment, the plural nanoparticles may include, but may not be limited to, any one of plural inorganic particles and plural organic particles or combination particles thereof.

In accordance with an illustrative embodiment, the carbon precursor may be prepared by a method including, but may not be limited to, a condensation polymerization reaction of a monomer selected from the group consisting of phenol-formaldehyde, phenol, furfuryl alcohol, resorcinol-formaldehyde (RF), aliphatic hydrocarbon-based or aromatic hydrocarbon-based aldehydes including 1 to 20 carbon atoms, sucrose, glucose, xylose, and their combinations by using an acidic catalyst or a basic catalyst; or an addition polymerization reaction of monomer selected from the group consisting of divinylbenzene, acrylonitrile, vinylchloride, vinylacetate, styrene, methacrylate, methylmethacrylate, ethyleneglycol, dimethacrylate, urea, melamin, $CH_2=CRR'$ (for which R and R' independently represent an alkyl group or an aryl group including 1 to 20 carbon atoms, respectively), and their combinations by using a polymerization initiator.

In accordance with an illustrative embodiment, the spherical nanoparticle-carbon precursor coaggregate may be formed by, but may not be limited to, removing the solvent to form a spherical nanoparticle coaggregate by self assembly from the plural nanoparticles included in an oil-in-water type droplet or a water-in-oil type droplet.

In accordance with an illustrative embodiment, the spherical nanoparticle-carbon precursor coaggregate may be formed by, but may not be limited to, removing the solvent to form a spherical nanoparticle coaggregate by self assembly from the plural nanoparticles included in an oil-in-water type droplet or a water-in-oil type droplet, permeating the carbon precursor to pores of the spherical nanoparticle coaggregate, and forming the carbon precursor from the surface of a nanoparticle at the core of the spherical nanoparticle coaggregate.

In accordance with an illustrative embodiment, an oil phase of the oil-in-water type droplet or the water-in-oil type droplet may be formed including, but may not be limited to, an aliphatic hydrocarbon-based organic solvent or an aromatic hydrocarbon-based organic solvent.

In accordance with an illustrative embodiment, the spherical nanoparticle-carbon precursor coaggregate may be formed by, but may not be limited to, adjusting the size of the nanoparticle and/or the quantity of carbon precursor included in the droplet, in which the carbon precursor is included from a surface of nanoparticle at the core of the spherical nanoparticle-carbon precursor coaggregate to a surface of nanoparticle at the exterior of the spherical nanoparticle-carbon precursor coaggregate.

In accordance with an illustrative embodiment, the removing of the nanoparticles included in the spherical nanoparticle-carbon coaggregate may include, but may not be limited to, removing the nanoparticles by dissolution.

In accordance with a second aspect of the present disclosure, there may be provided a spherical porous carbon structure produced by the production method and including an inverse opal structure.

In accordance with an illustrative embodiment, the spherical porous carbon structure may include, but may not be limited to, a three-dimensional pore assembly.

In accordance with an illustrative embodiment, pores in the spherical porous carbon structure may be, but may not be limited to, connected to one another.

In accordance with an illustrative embodiment, a pore in the spherical porous carbon structure may have a size of, but may not be limited to, from about 100 nm to about 1 μm.

In accordance with an illustrative embodiment, the spherical porous carbon structure may have a size of, but may not be limited to, from about 1 μm to about 100 μm.

In accordance with a third aspect of the present disclosure, there may be provided a spherical porous metallic catalyst body including the spherical porous carbon structure including a metal particle or a metal coating layer.

In accordance with an illustrative embodiment, the metal may include one or more selected from, but may not be limited to, the group consisting of Pt, Ru, Rh, Os, Ir, Re, Co, Ni, Ti, Cu, Zr, Sr, Zn, In, Yr, La, V, Mo, W, Sn, Nb, Mg, Al, Y, Sc, Sm, Pd, and Ga.

In accordance with a fourth aspect of the present disclosure, there may be provided a fuel cell including the spherical porous metallic catalyst body.

In accordance with a fifth aspect of the present disclosure, there may be provided a mobile phone, a notebook computer or an automobile including the fuel cell.

Effect of the Invention

In accordance with the present disclosure, it is possible to easily produce a spherical porous carbon structure having a micrometer size by using a spherical nanoparticle-carbon precursor coaggregate as a template. Further, while a spherical nanoparticle-carbon precursor coaggregate is prepared by using a droplet, various sized particles can be selected and the amount of a carbon precursor included in the droplet can be adjusted, so that it is possible to produce a spherical porous carbon structure having a required size and including pores having a required size. Therefore, the spherical porous carbon structure can be produced appropriately for a purpose of use. Further, the spherical porous carbon structure in accordance with the present disclosure has nanometer-sized pores and the pores are connected to one another, so that the spherical porous carbon structure has a three-dimensional network structure. Therefore, the spherical porous carbon structure can be used in various ways for self-purification of air and water pollution by means of a photocatalytic reaction and a photoelectrochemical conversion, production of hydrogen for hydrogen fuel cells by means of water decomposition, and the like.

BRIEF DESCRIPTION OF THE DRAWINGS

FIG. 1A is a schematic diagram of a production method of a spherical porous carbon structure in accordance with an illustrative embodiment of the present disclosure.

BEST MODE FOR CARRYING OUT THE INVENTION

Figure 1B:
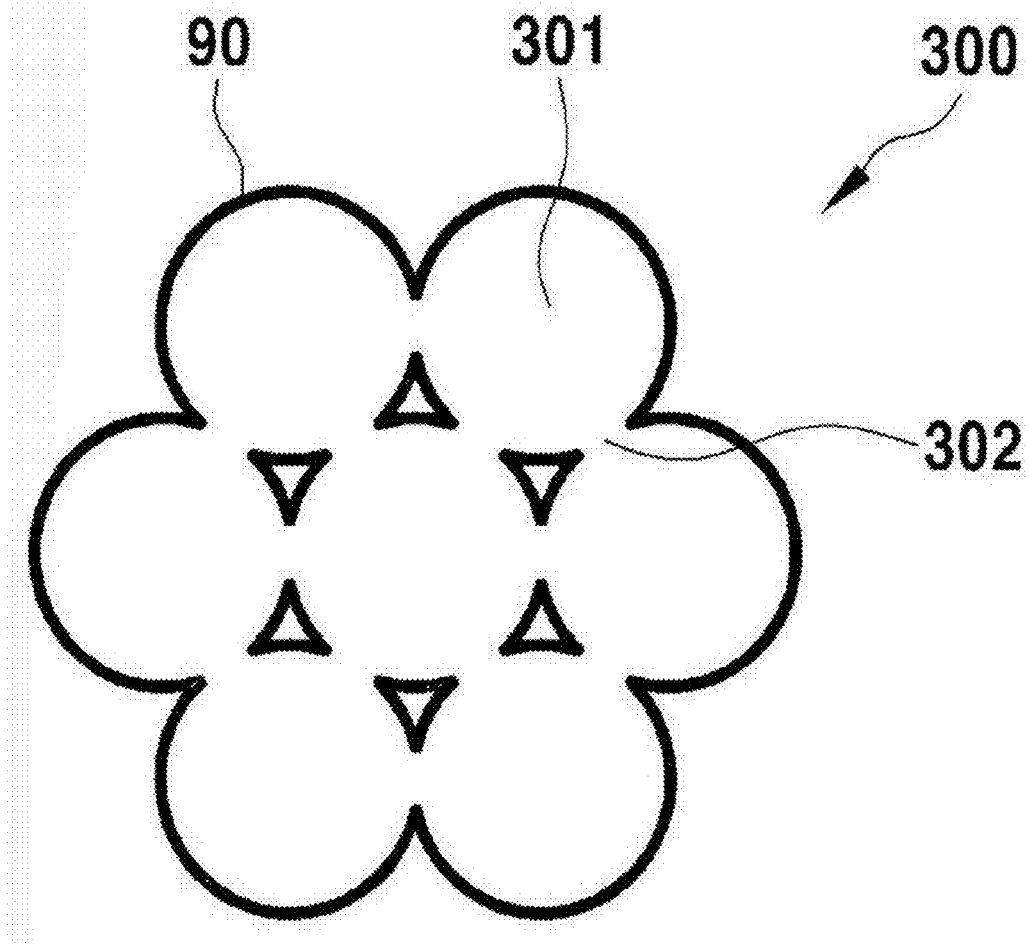
FIG. 1B is an enlarged view of the spherical porous carbon structure in step S4 of FIG. 1A in accordance with an illustrative embodiment of the present disclosure.

Hereinafter, illustrative embodiments and examples of the present disclosure will be described in detail with reference to the accompanying drawings so that the present disclosure may be readily implemented by those skilled in the art.

However, it is to be noted that the present disclosure is to the illustrative embodiments and examples but can be embodied in various other ways. In drawings, parts irrelevant to the description are omitted for the simplicity of explanation, and like reference numerals denote like parts through the whole document.

Through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "on" that is used to designate a position of one element with respect to another element includes both a case that the one element is adjacent to the another element and a case that any other element exists between these two elements.

The term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

In accordance with a first aspect of the present disclosure, there may be provided a production method of a spherical porous carbon structure via a sacrificial template process. The production method includes: using a spherical nanoparticle-carbon precursor coaggregate as a template, wherein the nanoparticle-carbon precursor coaggregate is formed by removing a solvent from a droplet including plural nanoparticles and a carbon precursor, in which the spherical nanoparticle-carbon precursor coaggregate includes the carbon precursor on a surface of the plural nanoparticles.

In accordance with an illustrative embodiment, the production method of a spherical porous carbon structure may further includes, but may not be limited to: forming a spherical nanoparticle-carbon coaggregate by calcining the spherical nanoparticle-carbon precursor coaggregate in a reducing atmosphere; and removing the plural nanoparticles included in the spherical nanoparticle-carbon coaggregate.

FIG. 1A is a schematic diagram of a production method of a spherical porous carbon structure in accordance with an illustrative embodiment of the present disclosure. Hereinafter, an illustrative embodiment of the present disclosure will be explained in detail with reference to FIG. 1A.

During step S1, in an emulsion 70 including two kinds of immiscible liquids, i.e. a water phase 40 and an oil phase 60, there may be formed an water-in-oil type droplet 50 in which plural nanoparticles 10 and a carbon precursor 30 (dissolved in a droplet solvent 20) are dispersed in the droplet solvent 20. By gradually removing the droplet solvent 20 included in the water phase 40 from the droplet 50 by means of evaporation or the like, a spherical nanoparticle-carbon precursor coaggregate 100 can be formed. In an exemplary embodiment, after the plural nanoparticles 10 are dispersed in the droplet solvent 20, the carbon precursor 30 is mixed and stirred in the droplet solvent 20, and then the mixture is dropped onto oil prepared to form an oil phase so as to form the emulsion 70 and can be stirred again to so as to form the droplet 50.

In accordance with an illustrative embodiment, the nanoparticle may include, but may not be limited to, any one of inorganic particle and organic particle or combination particle thereof. In accordance with an illustrative embodiment, the inorganic nanoparticle may be one known to those skilled in the art and there is no specific limitation. In the present disclosure, the nanoparticle may include, but may not be limited to, one or more selected from the group consisting of typical inorganic materials known in the art, such as a metal, a metal alloy, a metallic oxide, a metallic sulfide, other ceramic, and combinations thereof. The plural inorganic nanoparticles may be produced by, but may not be limited to, uniformly dissolving and mixing one or more inorganic nanoparticle precursors for forming an inorganic nanoparticle selected from, for non-limited example, a metallic element or complex; various acid salts such as metal-containing sulfate, hydrochloride, nitrate, phosphate, acetate, and oxalate; and hydroxide, chloride, sulfide, oxide, nitride, carbide, cyanide, and combinations thereof in a solvent or a dispersion medium for producing an inorganic precursor solution by means of a sol-gel method. Although there is no specific limitation in the solvent or the dispersion medium for producing the inorganic precursor solution, desirably, the solvent or the dispersion medium may be suitable for uniform dissolution and mixing and may be easily removed. By way of non-limited example, the solvent for producing the inorganic precursor solution may include one or more selected from distilled water; alcohols such as ethanol and methanol; acetone, tetrahydrofuran, methylene chloride, chloroform, dimethylformamide, N-methyl-2-pyrrolidone (NMP), cyclohexane; and combinations thereof.

In an exemplary embodiment, the inorganic nanoparticle may include a silica nanoparticle. The silica nanoparticle can be prepared by any method publicly known in the art for preparing uniform nanoparticles without specific limitation. By way of example, the silica nanoparticle can be synthesized by means of a sol-gel method using the Stober-Fink-Bohn method in which a silica precursor such as tetraethyl orthosilicate (TEOS) is mixed with ammonia at an adequate ratio in an aqueous solution. To be specific, the silica nanoparticle can be prepared by the following method. Above all, an anionic polymer is mixed and stirred in distilled water or a buffer solution and alcohols such as ethanol or methanol are added to prepare a mixed solution. Then, ammonia and tetraethyl orthosilicate (TEOS) are mixed and stirred in the mixed solution to produce a silica nanoparticle by means of a sol-gel method. Meanwhile, by adjusting a mass ratio between the distilled water and the anionic polymer, various silica nanoparticles having a uniform particle size can be prepared. The anionic polymer is water-soluble and has an anionic functional group. To be specific, desirably, the anionic polymer may include any one or a combination of at least two or more selected from a poly(acrylic acid) (PA)-based polymer, a poly(methacrylate) (PMA)-based polymer, a poly(thiophene acetic acid) (PTTA)-based polymer, and a poly(sulfonate styrene) (PSS)-based polymer. The anionic functional group may include a carboxyl group (—COO—), a sulfonic acid group (—$SO_3$—), or an acetoxy group (—$CH_2COO$—). The mass ratio between the stirred and mixed solution and the alcohols is in a range of from about 1:5 to about 1:15. The mass ratio between the ammonia and the tetraethyl orthosilicate (TEOS) is in a range of from about 1:0.5 to about 1:5. Desirably, after the reaction, a step for cleaning with alcohols may be included. The nanoparticle may have a size in a range of from about 90 nm to about 350 nm. Desirably, a reaction temperature during the stirring process may be in a range of from about 40° C. to about 80° C.

In an exemplary embodiment, the plural nanoparticles may include organic nanoparticles. The plural organic nanoparticles may include, but may not be limited to, polymer nanoparticles. Any polymer nanoparticle which can be produced in a uniform nano-sized particle may be used without specific limitation. The polymer nanoparticles may spherical nanoparticles having a uniform size. By way of example, the polymer nanoparticle may include, but may not be limited to, polystyrene, polymethylmethacrylate, polyphenylmethacrylate, polyacrylate, polyalphamethylstyrene, poly(1-methylcyclohexylmethacrylate), polycyclohexylmethacrylate, polybenzylmethacrylate, polychlorobenzylmethacrylate, poly(1-phenylcyclohexylmethacrylate), poly(1-phenylethylmethacrylate), polyfurfurylmethacrylate, poly(1,2-diphenylethylmethacrylate), polypentabromophenylmethacrylate, polydiphenylmethylmethacrylate, polypentachlorophenylmethacrylate, combinations thereof or copolymers thereof.

In an exemplary embodiment, the polymer nanoparticle may be produced by a method publicly known in the art, for example, but may not be limited to, an emulsifier-free emulsion polymerization method. Further, the polymer nanoparticle may be formed by, but may not be limited to, addition of a cross-linker. By way of example, divinylbenzene or ethyleneglycoldimethacrylate may be used as the cross-linker. By adding the cross-linker, it is possible to prevent deformation of a particle caused by an oil phase such as toluene. By way of example, the organic nanoparticle may include, but may not be limited to, the above-described polymer, a resin sphere publicly known in the art or an organic surfactant. In an exemplary embodiment, the organic nanoparticle may be produced in the form of, but may not be limited to, a resol.

The droplet 50 may include the carbon precursor 30, and as the carbon precursor, a material which can be reduced to carbon through a carbonization process including a heat treatment or calcination in a reducing atmosphere without oxygen may be used. A phase of the carbon precursor included in the droplet 50 may be, but may not be limited to, a liquid phase.

In accordance with an illustrative embodiment, the carbon precursor may be prepared by a method including, but may not be limited to, a condensation polymerization reaction of a monomer selected from the group consisting of phenol-formaldehyde, phenol, furfuryl alcohol, resorcinol-formaldehyde (RF), aliphatic hydrocarbon-based or aromatic hydrocarbon-based aldehydes including 1 to 20 carbon atoms, sucrose, glucose, xylose, and their combinations by using an acidic catalyst or a basic catalyst; or an addition polymerization reaction of monomer selected from the group consisting of divinylbenzene, acrylonitrile, vinylchloride, vinylacetate, styrene, methacrylate, methylmethacrylate, ethyleneglycol, dimethacrylate, urea, melamin, $CH_2$=$CRR'$ (for which R and R' independently represent an alkyl group or an aryl group including 1 to 20 carbon atoms, respectively), and their combinations by using a polymerization initiator. As the polymerization initiator, any material that initiates an addition polymerization reaction can be used without limitation. By way of example, the polymerization initiator may one or more selected from azobisisobutyronitrile (AIBN), t-butyl peracetate, benzoyl peroxide (BPO), acetyl peroxide, lauryl peroxide or combinations thereof.

In accordance with an illustrative embodiment, as the carbon precursor, a phenol-formaldehyde (PF) resol may be used. Phenol is heated in an oven at about 60° C. to about 80° C. for about 20 minutes to about 30 minutes and put into a microtube for drop wise addition of the phenol to a 20% NaOH aqueous solution. Then, a formalin aqueous solution is added thereto for a reaction at about 60° C. to about 80° C. for about 50 minutes to about 70 minutes. Thereafter, a 0.6 M chloride aqueous solution is dropped so as to neutralize pH to 7.0 and dried in a vacuum for about 24 hours and melted at a mass fraction of about 40% to about 50% in ethanol to produce the phenol-formaldehyde resol to be used as the carbon precursor.

During step S2 of FIG. 1A, as described in step S1, the droplet 50 in the emulsion 70 may include the plural nanoparticles 10 and the carbon precursor 30 (dissolved in the droplet solvent 20). While the droplet solvent 20 included in the water phase 40 is gradually removed from the droplet 50 by means of evaporation or the like, the spherical nanoparticle-carbon precursor coaggregate 100 including the carbon precursor 30 on the surface of the plural nanoparticles 10 can be formed. The droplet 50 may be an oil-in-water type droplet or a water-in-oil type droplet.

In accordance with an illustrative embodiment, the spherical nanoparticle-carbon precursor coaggregate may be formed by, but may not be limited to, removing the solvent to form a spherical nanoparticle coaggregate by self assembly from the plural nanoparticles included in an oil-in-water type droplet or a water-in-oil type droplet. In accordance with another illustrative embodiment, the spherical nanoparticle-carbon precursor coaggregate may be formed by removing a droplet solvent from an aerosol in which droplets are dispersed in a gas phase.

In accordance with an illustrative embodiment, the spherical nanoparticle-carbon precursor coaggregate may be formed by, but may not be limited to, removing the solvent to form a spherical nanoparticle coaggregate by self assembly from the plural nanoparticles included in an oil-in-water type droplet or a water-in-oil type droplet, permeating the carbon precursor to pores of the spherical nanoparticle coaggregate, and forming the carbon precursor from the surface of a nanoparticle at the core of the spherical nanoparticle coaggregate.

In an exemplary embodiment, during step S2 of FIG. 1A, the spherical nanoparticle-carbon precursor coaggregate 100 may be formed by, but may not be limited to, removing the droplet solvent 20 constituting the droplet from the droplet 50 in which the plural nanoparticles 10 and the carbon precursor 30 are dispersed so that the plural nanoparticles are self-assembled. The droplet 50 is a spherical micro droplet of a disperse phase dispersed on a continuous phase by applying a mechanical force to two kinds of immiscible liquids. By way of example, if a water phase is a continuous phase and an oil phase is a disperse phase, the droplet 50 may be an oil-in-water type droplet, or if an oil phase is a continuous phase and a water phase is a disperse phase, the droplet 50 may be a water-in-oil type droplet.

In an exemplary embodiment, plural nanoparticles and a carbon precursor are introduced and dispersed in a water droplet dispersed on an oil phase as a continuous phase including an organic solvent and water is removed from the droplet, so that a spherical nanoparticle-carbon precursor coaggregate can be produced. In another exemplary embodiment, plural nanoparticles and a carbon precursor are introduced and dispersed in an oil droplet dispersed on a water phase as a continuous phase and oil is removed from the droplet, so that a spherical nanoparticle-carbon precursor coaggregate can be produced.

In accordance with an illustrative embodiment, an oil phase of the oil-in-water type droplet or the water-in-oil type droplet may be formed including, but may not be limited to, an aliphatic hydrocarbon-based organic solvent or an aromatic hydrocarbon-based organic solvent.

In an exemplary embodiment, aliphatic hydrocarbon-based organic solvents or aromatic hydrocarbon-based organic solvents may be selected appropriately by those skilled in the art without specific limitation from organic solvents having 6 to 20 carbon atoms. By way of example, the aliphatic hydrocarbon-based organic solvent may include, but may not be limited to, linear or branched aliphatic hydrocarbon having 6 to 20 carbon atoms or 10 to 20 carbon atoms. By way of example, the aromatic hydrocarbon-based organic solvent may include, but may not be limited to, toluene, and the aliphatic hydrocarbon-based organic solvent may include, but may not be limited to, hexadecane. Meanwhile, the oil phase droplet forms a water/oil droplet system with water, and a surfactant may be used to stabilize the system. By way of example, the surfactant may include, but may not be limited to, Pluronic F108, SPAN 80 (sorbitan monooleate) or Hypermer 2296.

In accordance with an illustrative embodiment, the spherical nanoparticle-carbon precursor coaggregate may be formed by, but may not be limited to, adjusting the size of the nanoparticle and/or the quantity of carbon precursor included in the droplet, in which the carbon precursor is included from a surface of nanoparticle at the core of the spherical nanoparticle-carbon precursor coaggregate to a surface of nanoparticle at the exterior of the spherical nanoparticle-carbon precursor coaggregate. When the droplet solvent 20 included in the droplet 50 is gradually evaporated, the plural nanoparticles included in the droplet 50 are self-assembled by van der Waals force. When a spherical nanoparticle-carbon precursor coaggregate is gradually formed, the carbon precursor included in the droplet 50 permeates into pores of the spherical nanoparticle coaggregate and the carbon precursor is aggregated from the surface of a nanoparticle at the core of the spherical nanoparticle coaggregate, so that a spherical nanoparticle-carbon precursor coaggregate is formed.

According to step S2 of FIG. 1A, when the droplet solvent 20 in the droplet 50 is gradually evaporated, the carbon precursor 30 permeates into nanoparticles depending on the amount of the carbon precursor 30 included in the droplet 50. When the amount is small, the carbon precursor 30 permeates into pores of the nanoparticles in a narrow range from the core of the spherical nanoparticle-carbon precursor coaggregate, whereas when the amount of the carbon precursor 30 is increased, the carbon precursor 30 permeates into pores of the nanoparticles in a wide range from the core of the spherical nanoparticle-carbon precursor coaggregate. Therefore, by adjusting the amount of the carbon precursor 30 included in the droplet 50 and selecting a size of the nanoparticles included in the droplet 50, the spherical nanoparticle-carbon precursor coaggregate 100 can be produced in various forms and sizes.

As can be seen from step S3 of FIG. 1A, after the spherical nanoparticle-carbon precursor coaggregate 100 is produced in step S2, the oil phase 60 is removed and the spherical nanoparticle-carbon precursor coaggregate 100 is obtained. After the carbon precursor 30 is cross-linked, the carbon precursor 30 of the spherical nanoparticle-carbon precursor coaggregate 100 is heat-treated or calcined in a reducing atmosphere, so that a spherical nanoparticle-carbon coaggregate 200 including the nanoparticles 10 coated with a carbon coating layer 80 can be produced in step S3.

In an exemplary embodiment, the carbon precursor 30 of the spherical nanoparticle-carbon precursor coaggregate 100 may be cross-linked by, but may not be limited to, storing the carbon precursor 30 in a vacuum chamber at about 80° C. to about 120° C. for about a day and then storing the carbon precursor 30 in the vacuum chamber at about 120° C. to about 160° C. for about a day. The carbon precursor may be cross-linked by a typical method for those skilled in the art to solidify a carbon precursor.

In an exemplary embodiment, a process for heat-treating or calcining the spherical nanoparticle-carbon precursor coaggregate 100 in which the carbon precursor 30 is cross-linked may be performed in a reducing atmosphere without oxygen, i.e. in an atmosphere including an inert gas such as He and Ne, a hydrogen gas, a nitrogen gas or a $SF_6$ gas. By performing the heat treatment or calcination in such a reducing atmosphere, the carbon precursor 30 included in the spherical nanoparticle-carbon precursor coaggregate 100 is carbonized, so that the spherical nanoparticle-carbon coaggregate 200 can be formed. Depending on a kind of a carbon precursor material, a temperature of the heat treatment or calcination in the reducing atmosphere is selected from a range in which the carbon precursor material can be carbonized. A time for the heat treatment or calcination in the reducing atmosphere is not specifically limited and may be selected appropriately from a range in which all the carbon precursor material can be carbonized. By way of example, the temperature of the heat treatment or calcination in the reducing atmosphere may be, but may not be limited to, in a range of from about 600° C. to about 1200° C., or from about 700° C. to about 1100° C., or from about 800° C. to about 1000° C., and the time for the heat treatment or calcination may be, but may not be limited to, about 1 hour or more, i.e. in a range of from about 1 hour to about 10 hours.

In accordance with an illustrative embodiment, the removing the nanoparticles included in the spherical nanoparticle-carbon coaggregate may include, but may not be limited to, removing the nanoparticles by dissolution.

As illustrated in step S4 of FIG. 1A, regarding the plural nanoparticles 10 included in the spherical nanoparticle-carbon coaggregate 200 obtained in step S3, the nanoparticles selected to produce the spherical nanoparticle-carbon coaggregate may include any one of the plural inorganic particles and the plural organic particles or combinations thereof as described above. Depending on properties of the selected nanoparticles, the nanoparticles can be removed by using a method adequately selected by those skilled in the art for selectively removing the nanoparticles except carbon components included in the nanoparticle-carbon coaggregate. Thus, a spherical porous carbon structure 300 including porous carbon particles 90 having an inverse opal structure can be obtained in step S4 of FIG. 1A.

In an exemplary embodiment, silica nanoparticles may be selected to prepare droplets in step S1 of FIG. 1A, silica-carbon coaggregate may be prepared and impregnated in a 10-30% HF, NaOH or KOH etching solution for about 12 hours to about 36 hours to remove silica in steps S2 and S3, and a spherical porous carbon structure 300 may be produced in step S4, but the present disclosure may not be limited thereto. By way of example, if a concentration of the HF, NaOH or KOH etching solution is increased and used to remove nanoparticles, the nanoparticles may be removed in a relatively short time. Meanwhile, the etching solution can permeate into an aggregated part of the nanoparticles in the spherical nanoparticle-carbon coaggregate, and, thus, the nanoparticles present in the spherical nanoparticle-carbon coaggregate can be removed.

In accordance with a second aspect of the present disclosure, there may be provided a spherical porous carbon structure produced by the production method and including an inverse opal structure.

Figure 3A:
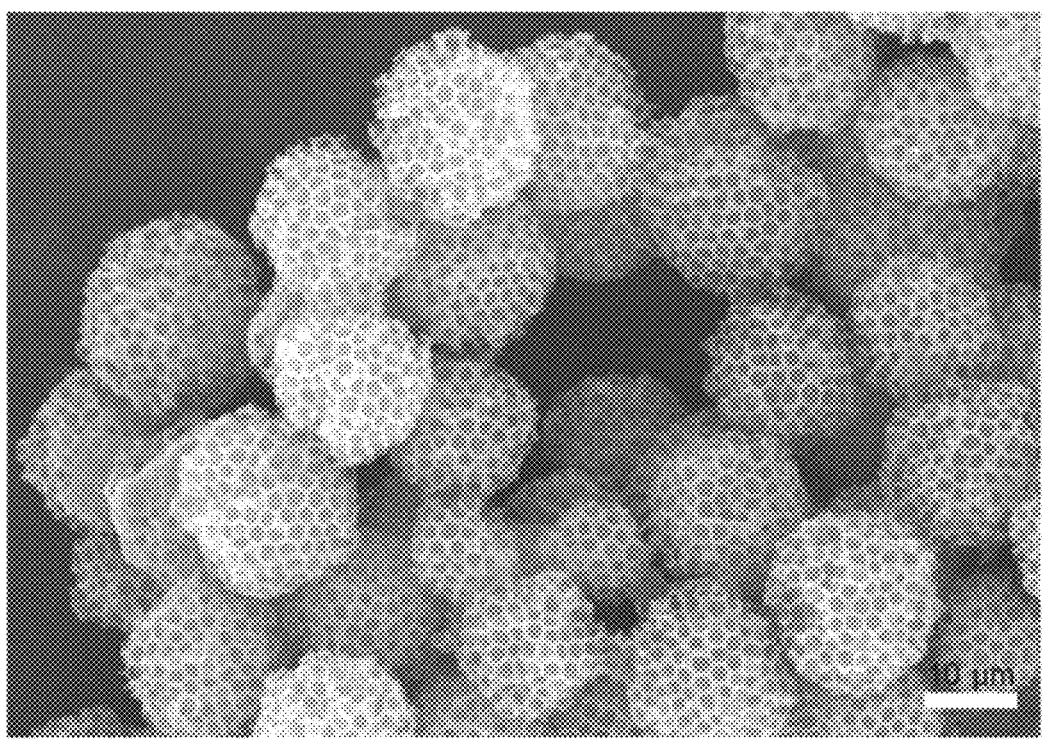
FIG. 3A provides an electron micrograph showing a spherical porous carbon structure in accordance with an example of the present disclosure.
Figure 3B:
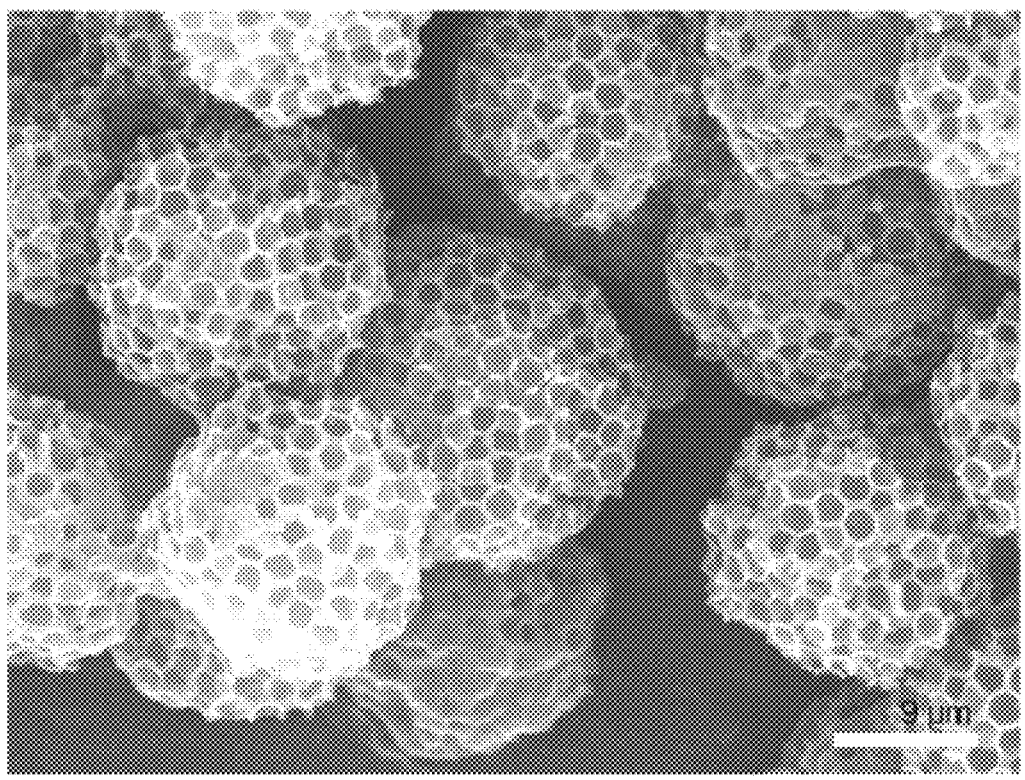
FIG. 3B is an enlarged view of FIG. 3A in accordance with an example of the present disclosure.
Figure 3C:
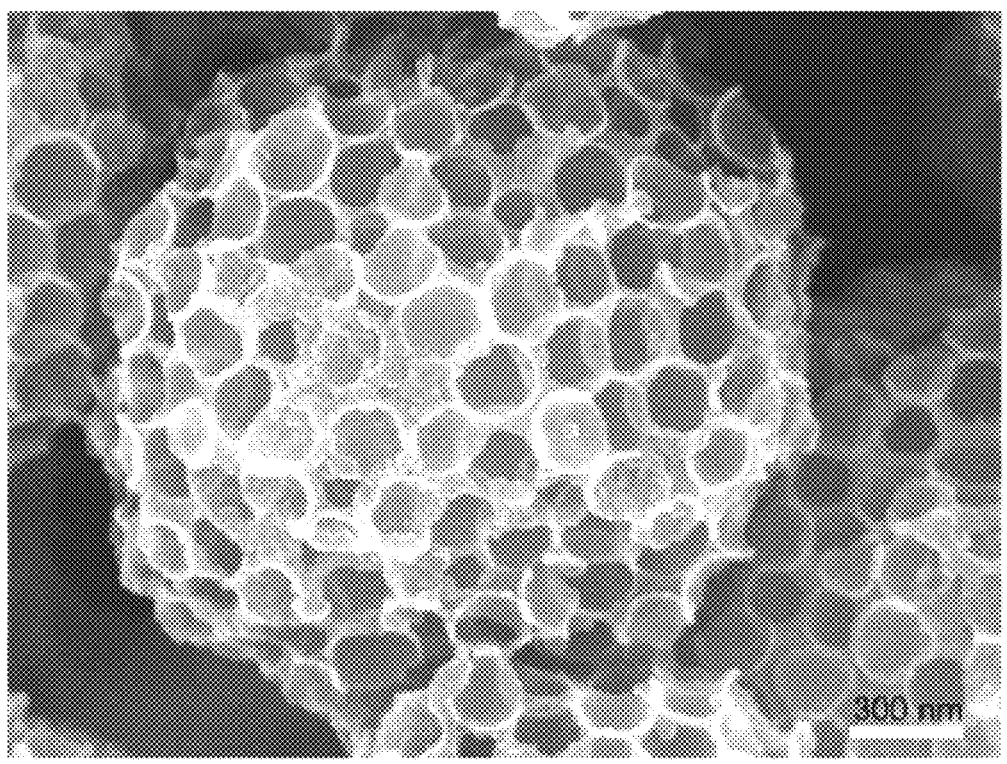
FIG. 3C is an enlarged view of FIG. 3B in accordance with an example of the present disclosure.

FIG. 1B is an enlarged view of a spherical porous carbon structure in accordance with an illustrative embodiment of the present disclosure, and FIGS. 3a to 3c provide electron micrographs each showing a spherical porous carbon structure in accordance with an example of the present disclosure.

As can be seen from FIG. 1B and FIGS. 3a to 3c, the plural nanoparticles 10 included in the spherical nanoparticle-carbon coaggregate 200 has an opal structure and then, the plural nanoparticles 10 are removed, so that the spherical porous carbon structure 300 having an inverse opal structure is formed.

In accordance with an illustrative embodiment, the spherical porous carbon structure may include, but may not be limited to, a three-dimensional pore assembly.

In accordance with an illustrative embodiment, pores in the spherical porous carbon structure may be, but may not be limited to, connected to one another.

Referring to FIG. 1b and FIGS. 3a to 3c, the spherical porous carbon structure 300 includes pores 301 and also includes an inverse opal structure and a three-dimensional pore assembly. The pores 301 are spaces where the nanoparticles included in the spherical nanoparticle-carbon coaggregate 200 were located and the pores 301 are formed by removing the nanoparticles. A pore tunnel 302 is formed between the pores 301. When the solvent is removed by using the droplet 50 and the nanoparticle-carbon precursor coaggregate 100 is formed by self assembly, the carbon precursor 30 cannot permeate into a contact surface between the nanoparticles. Thus, the pore tunnel 302 is formed by removing the nanoparticles. If the spherical porous carbon structure itself is used as a catalyst body or the spherical porous carbon structure carrying metal or coated with metal is used as a catalyst body, by way of non-limited example, if the spherical porous carbon structure is used in a fuel cell, structure of the pore tunnel 302 enables protons to be transferred with more efficiency.

In accordance with an illustrative embodiment, a pore in the spherical porous carbon structure may have a size of, but may not be limited to, from about 100 nm to about 1 µm.

A size of a pore in the spherical porous carbon structure can be adjusted by a size of a nanoparticle used to form the spherical nanoparticle coaggregate. A size of the pore tunnel 302 connecting the pores 301 may vary depending on sizes of nanoparticles used and a contact area between the nanoparticles.

In accordance with an illustrative embodiment, the spherical porous carbon structure may have a size of, but may not be limited to, from about 1 µm to about 100 µm.

In an exemplary embodiment, a size of the spherical porous carbon structure may be in a range of from about 1 µm to about 100 µm, for example, but may not be limited to, from about 1 µm to about 100 µm or 10 µm to about 100 µm. As described above, the size of the spherical porous carbon structure may be adjusted by the size of the nanoparticle selected to form the spherical nanoparticle-carbon precursor coaggregate 100 and/or the quantity of the carbon precursor 30 included in the droplet 50. Meanwhile, the size of the nanoparticle-carbon precursor coaggregate 100 can be controlled by controlling a size of the droplet 50 or a concentration of the nanoparticles 10 included in the spherical nanoparticle-carbon precursor coaggregate 100. As a size of a droplet is increased and a concentration of nanoparticles included in the spherical nanoparticle-carbon precursor coaggregate is increased, the spherical nanoparticle-carbon precursor coaggregate is being micrometer-sized particles. A diameter of a micrometer-sized particle is proportional to the size of the droplet and proportional to a cube root of the concentration of the nanoparticles included in the spherical nanoparticle-carbon precursor coaggregate.

In accordance with a third aspect of the present disclosure, there may be provided a spherical porous metallic catalyst body including the spherical porous carbon structure including a metal particle or a metal coating layer.

In accordance with an illustrative embodiment, the metal may include one or more selected from, but may not be limited to, the group consisting of Pt, Ru, Rh, Os, Ir, Re, Co, Ni, Ti, Cu, Zr, Sr, Zn, In, Yr, La, V, Mo, W, Sn, Nb, Mg, Al, Y, Sc, Sm, Pd, and Ga.

If the spherical porous carbon structure includes a metal particle, the spherical porous carbon structure may be used as a carrier. It may be easy for those skilled in the art to adequately select metal, a reagent, and conditions to carry the metal particle in the spherical porous carbon structure. Meanwhile, a method for coating metal on the spherical porous carbon structure may be adequately selected by those skilled in the art from coating methods publicly known in the art. In an exemplary embodiment, the metal may be coated by means of, but may not be limited to, a chemical wet deposition method. By way of example, the chemical wet deposition method may include, but may not be limited to, an electroless plating method or an electrodeposition method. It may be easy for those skilled in the art to adequately select a reagent and conditions to perform the chemical wet deposition method based on technical common sense. By way of example, the metal may be coated by means of the chemical wet deposition method by using an aqueous solution including a salt of the metal and a reducing agent to control pH adequately. Meanwhile, a thickness of the coated metal can be adjusted by adjusting a concentration, a temperature, and pH of the metallic salt aqueous solution used in the chemical wet deposition.

In accordance with a fourth aspect of the present disclosure, there may be provided a fuel cell including the spherical porous metallic catalyst body.

A fuel cell is an electric generation system that converts chemical energy from a chemical reaction between oxygen and hydrogen contained in a hydrocarbon-based material such as methanol, ethanol, and natural gas directly into electricity energy. Fuel cells can be classified into a phosphoric acid fuel cell, a molten carbonate fuel cell, a solid oxide fuel cell, a polymer electrolyte membrane fuel cell, and an alkaline fuel cell depending on a kind of an electrolyte used in a fuel cell. These fuel cells are operated according to the basically same principle. A catalyst is essential for an electrode, and the spherical porous metallic catalyst body in accordance with the present disclosure may be used.

In an exemplary embodiment, in a polymer electrolyte membrane fuel cell (PEMFC), a stack for actually generating electricity has a stacked structure of several to several tens of unit cells including an membrane electrode assembly (MEA) and a separator (or a bipolar plate). Such a fuel cell can be produced by those skilled in the art by adequately selecting and using the spherical porous metallic catalyst body. By way of example, the fuel cell can be produced by introducing an electrode including a polymer electrode membrane and the spherical porous metallic catalyst body on both surfaces of the polymer electrode membrane into an membrane electrode assembly and placing a separator on both surfaces of the membrane electrode assembly.

In accordance with a fifth aspect of the present disclosure, there may be provided a mobile phone, a notebook computer or an automobile including the fuel cell.

A mobile phone, a notebook computer or an automobile including the fuel cell can be manufactured by those skilled in the art by adequately selecting and applying a process including the fuel cell to a process corresponding to a product to be manufactured. In an exemplary embodiment, in case of an automobile including the fuel cell, the fuel cell for generating electricity through an electrochemical reaction between hydrogen as a fuel gas and oxygen in the air as an oxidizing gas includes a stacked spherical porous metallic catalyst body. The automobile including the fuel cell includes a motor connected through an inverter to the fuel cell including the stacked spherical porous metallic catalyst body, a battery connected through a DC/DC converter to a power line that connects the inverter to the fuel cell including the stacked spherical porous metallic catalyst body, and an electronic control unit that controls the whole system, and further includes a driving shaft connected through a differential gear to a driving wheel, wherein power output from the motor is output through the driving shaft to the driving wheel.

The micrometer-sized spherical porous carbon structure formed by using a spherical nanoparticle-carbon precursor coaggregate as a template in accordance with the present disclosure has nanometer-sized pores and the pores are connected to one another, so that the spherical porous carbon structure has a three-dimensional network structure. Therefore, the spherical porous carbon structure can be used in various ways for self-purification of air and water pollution by means of a photocatalytic reaction and a photoelectrochemical conversion, production of hydrogen for hydrogen fuel cells by means of water decomposition, and the like.

Hereinafter, examples of the present disclosure will be provided for more detailed explanation. However, the present disclosure may not be limited thereto.

Example 1

Production of a spherical porous carbon structure
1. Preparation of a Phenol-formaldehyde Resol as a Carbon Precursor Phenol was heated in an oven at about 70° C. for about 30 minutes, and then 1 g of the phenol was put into a microtube and a 20% NaOH aqueous solution of 200 µl was added dropwise. Then, a 37% formalin aqueous solution of 1 ml was added thereto for a reaction at about 70° C. for about 60 minutes. Thereafter, a 0.6 M chloride aqueous solution was dropped so as to neutralize pH to 7.0 and dried in a vacuum for about 24 hours and melted at a mass fraction of about 50% in ethanol to produce a phenol-formaldehyde resol to be used as a carbon precursor.

2. Preparation of a Spherical Silica-carbon Precursor Coaggregate using a Droplet Uniform silica particles were synthesized by means of a sol-gel method using the Stober-Fink-Bohn method. To be specific, a solution in which 70 ml of ethanol, 10 ml of water, and 5 ml of ammonia aqueous solution were mixed and a solution in which 7 ml of tetraethyl orthosilicate (TEOS) was dissolved in 30 ml of ethanol were mixed and stirred at room temperature for about 3 hours, and, thus, uniform silica particles (diameter of about 250 nm) were synthesized by means of a sol-gel method. The silica particles were washed several times with distilled water and ethanol and dispersed again in distilled water. The silica particles (diameter of about 250 nm) having about 37 vol % was mixed with 5-20 µl of phenol-formaldehyde resol previously prepared as a carbon precursor by using a sonication device. 10 ml of hexadecane mixed with Hypermer 2296 (dispersion stabilizer, Croda) having about 1 wt % was prepared in a vial.

The mixture of the silica particles and the phenol-formaldehyde resol was dropped into the vial including the hexadecane. The hexadecane including an emulsion (water-in-oil) droplet was stirred at about 3000 rpm for about 10 seconds by using a stirrer and stored in an oven at about 60° C. for about 12 hours for crystallization for evaporating water from the emulsion droplet. Then, the hexadecane was removed by being washed several times with hexane, and the hexane was removed from a vacuum chamber, and, thus, a spherical nanoparticle-carbon precursor coaggregate was obtained.

Figure 2A:
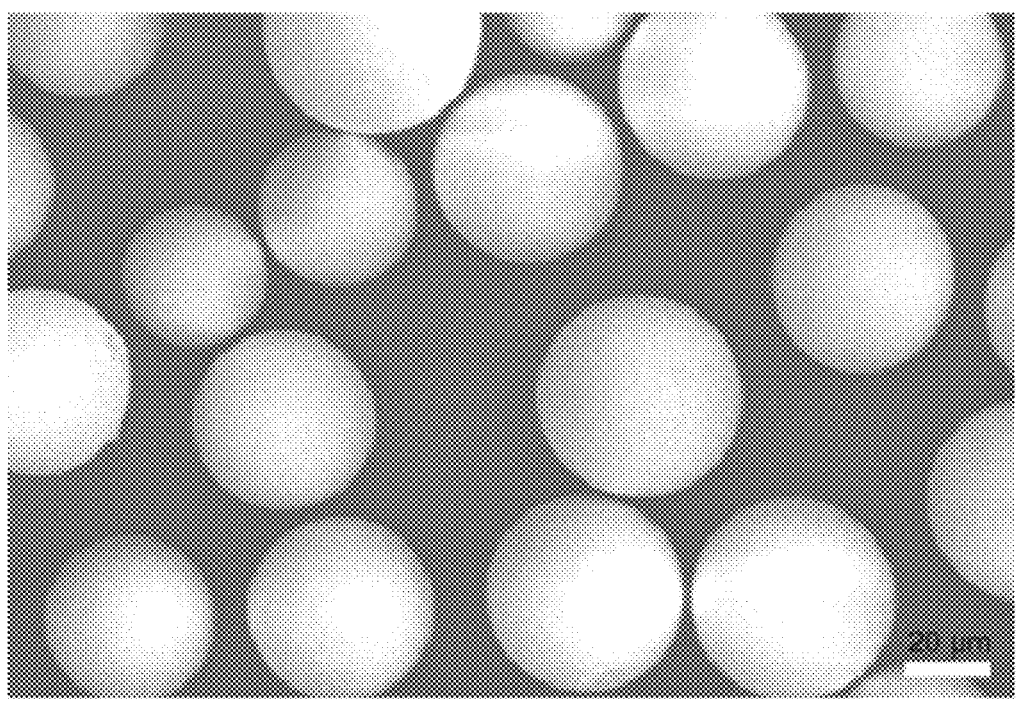
FIG. 2A provides an electron micrograph showing the inside of a droplet of a phenol-formaldehyde resol including silica particles during a production of a spherical nanoparticle-carbon precursor coaggregate in accordance with an illustrative embodiment of the present disclosure.

FIG. 2A provides an electron micrograph showing the inside of a droplet of a phenol-formaldehyde resol including silica particles in a production of a spherical nanoparticle-carbon precursor coaggregate in accordance with an illustrative embodiment of the present disclosure.

Figure 2B:
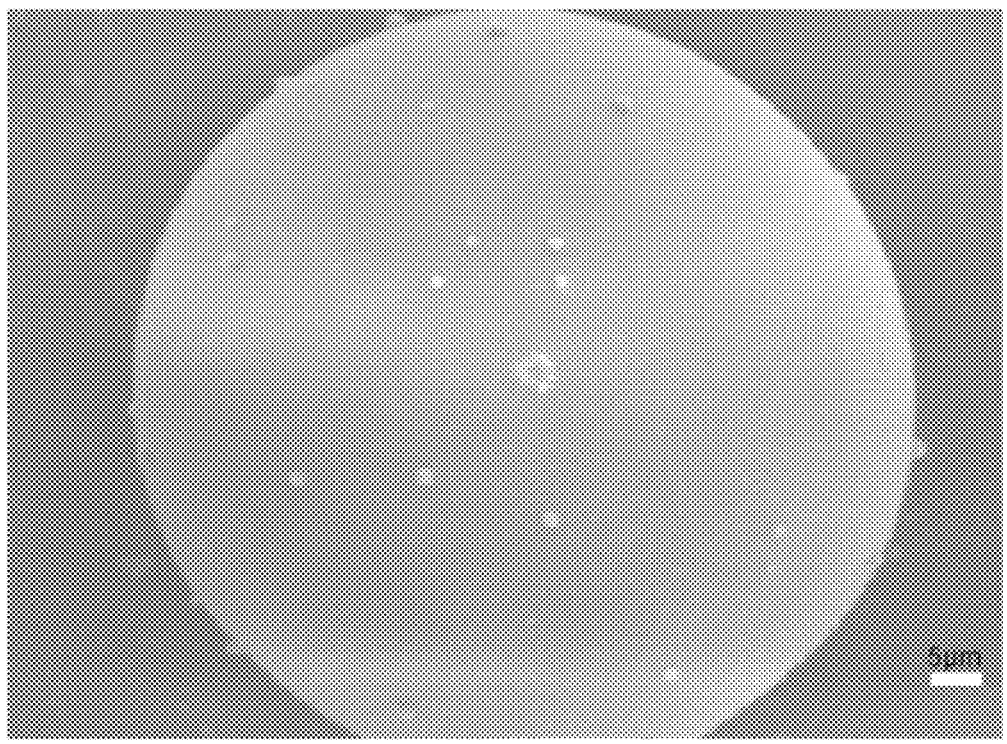
FIG. 2B provides an electron micrograph enlarging the silica particles of FIG. 2A.

FIG. 2B provides an electron micrograph enlarging the silica particles of FIG. 2A.

Figure 2C:
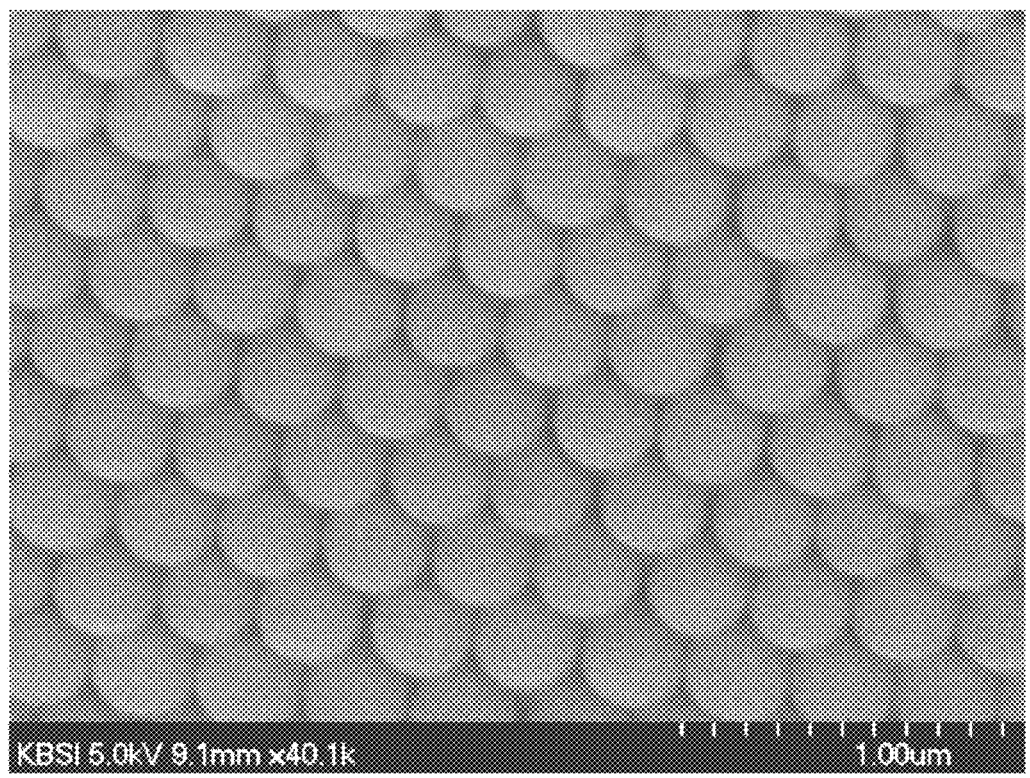
FIG. 2C provides an electron micrograph showing a surface of a nanoparticle outside a spherical nanoparticle-carbon precursor coaggregate from which a droplet is removed in accordance with an example of the present disclosure.

FIG. 2C provides an electron micrograph showing a surface of a nanoparticle outside a spherical nanoparticle-carbon precursor coaggregate from which a droplet is removed in accordance with an example of the present disclosure. As can be seen from FIG. 2C, the uniform-sized silica particles have an inverse opal structure.

3. Preparation of a Silica-carbon Coaggregate

The obtained spherical silica-carbon precursor coaggregate including the phenol-formaldehyde resol as a carbon precursor was stored at about 100° C. for a day and at about 140° C. for another day, and, thus, the phenol-formaldehyde resol was cross-linked. Three cross-linked silica-carbon precursor coaggregate samples were heated in a furnace at temperatures of about 700° C., 800° C., and 900° C., respectively, for about 3 hours in an argon atmosphere so as to carbonize the phenol-formaldehyde resol as the carbon precursor, and, thus, silica-carbon coaggregates were produced.

Figure 4:
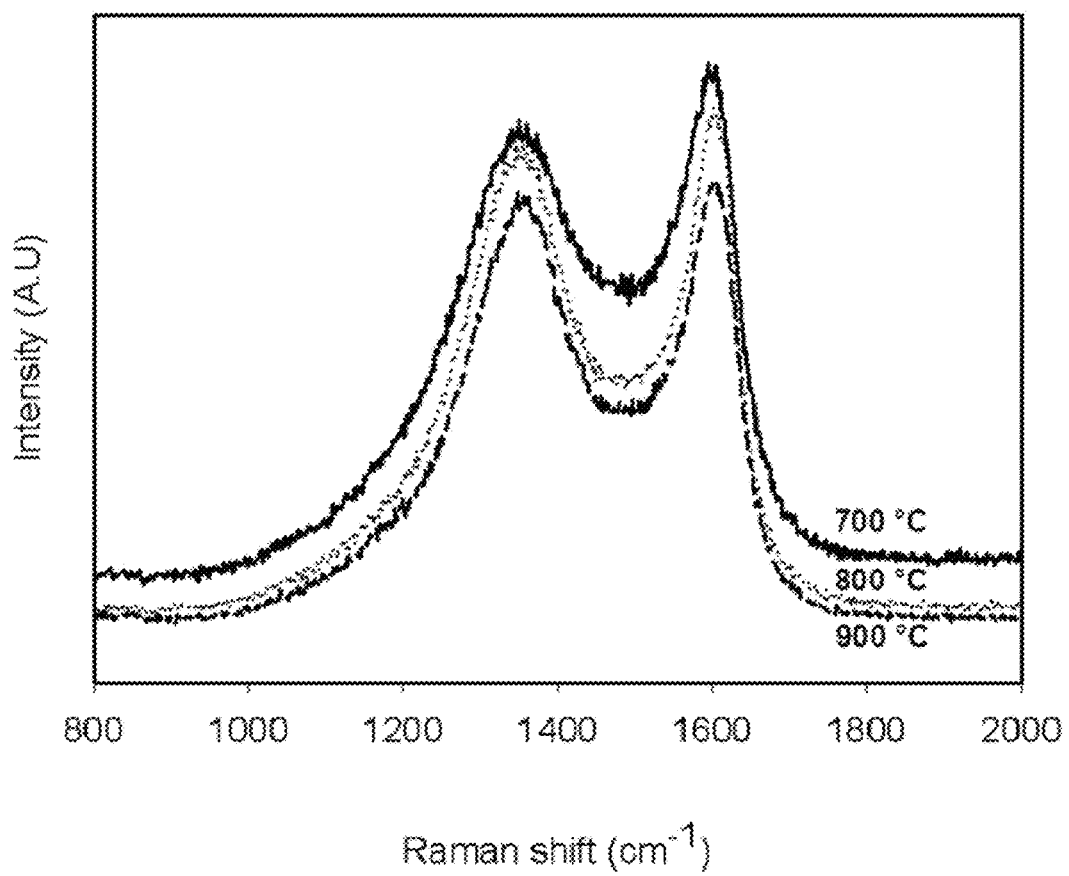
FIG. 4 provides Raman spectra of spherical porous carbon structures calcined at different temperatures in accordance with an example of the present disclosure.

FIG. 4 provides Raman spectra of spherical porous carbon structures calcined at different temperatures in accordance with an example of the present disclosure. Raman spectra of the silica-carbon coaggregates produced through carbonization at about 700° C., 800° C., and 900° C., respectively, were measured and analyzed. It could be seen that each of the silica-carbon coaggregates had a glassy carbon form with a well-treated surface. Meanwhile, a Raman peak at around 1300 $cm^{-1}$ was a peak "D" and a Raman peak at around 1600 $cm^{-1}$ was a peak "G". According to a result of the analysis, as a Raman peak ratio G/D was increased, graphite was increased, and as a temperature was increased in the Raman spectra, the Raman peak ratio G/D was increased and a graphite phase was increased.

4. Production of a Porous Carbon Structure

The obtained spherical silica-carbon coaggregate was stored in a 20% HF aqueous solution for about a day to etch and remove the silica and then washed with water several times to remove the 20% HF aqueous solution. Thus, a porous carbon structure was obtained.

FIGS. 3a to 3c provide electron micrographs showing the spherical porous carbon structure in accordance with the present example. It could be seen that the spherical porous carbon structure had a well-arranged structure including an inverse opal structure and a three-dimensional assembly.

Example 2

Production of a Spherical Porous Metallic Catalyst Body Coated with a Platinum Metallic Catalyst 1 g of $H_2PtCl_6 \cdot H_2O$ as a platinum (Pt) salt was dissolved in deionized water so as to prepare a platinum salt aqueous solution. Meanwhile, an adequate amount (0.3-0.4 µg) of the spherical porous carbon structure was stirred in water so as to prepare homogenized slurry. Then, 0.5 ml of the platinum salt aqueous solution previously prepared was added to the slurry so as to obtain mixed slurry. Thereafter, 3.0 M of NaOH aqueous solution was added so as to adjust pH to 8. While the mixed slurry was stirred, an excess $NaBH_4$ aqueous solution was added so as to contain $NaBH_4$ in a molar ratio of about 10:1 with respect to the platinum. Then, until platinum ions in the mixed slurry were completely reduced, the mixed slurry was stirred overnight and dried at about 70° C. all through the night. Thus, a spherical porous metallic catalyst body coated with a platinum metallic catalyst was obtained.

Figure 5:
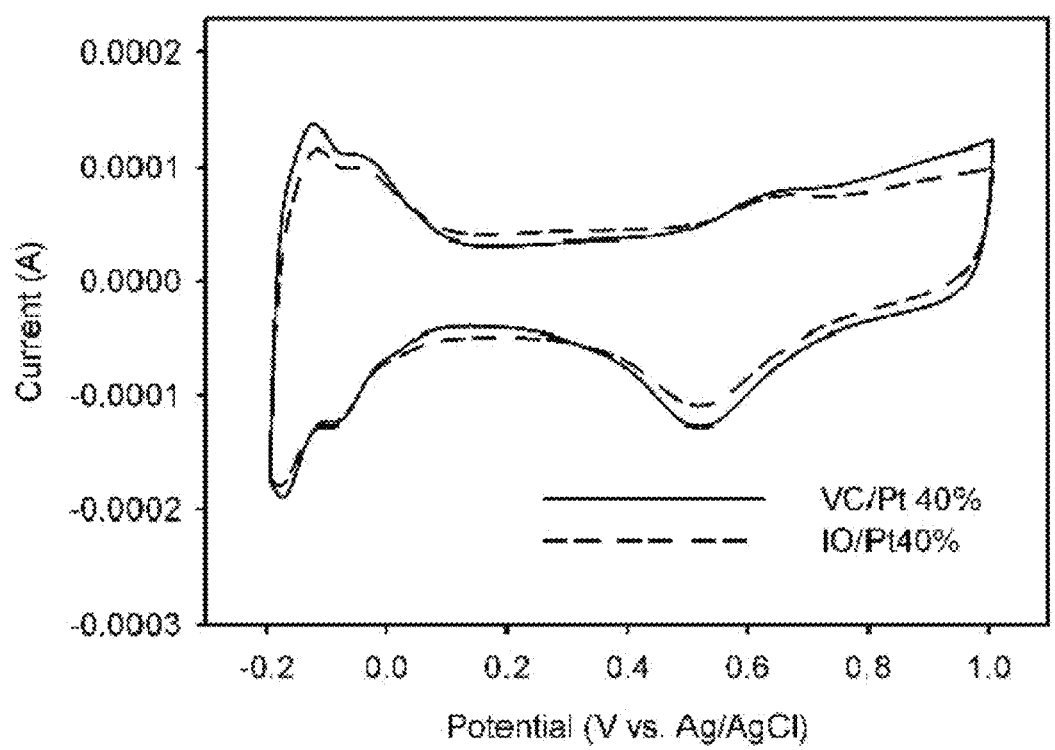
FIG. 5 provides a cyclic voltammetry (CV) graph comparing cyclic voltammetry data between a spherical porous metallic catalyst body in accordance with the present example and a catalyst coated with platinum and using a conventional porous carbon structure.

FIG. 5 provides a cyclic voltammetry (CV) graph showing CV data obtained by measuring on a carbon working electrode coated with the spherical porous metallic catalyst body coated with the platinum metallic catalyst in accordance with the present example by a tri-polar method. In FIG. 5, Pt 60% represents that Pt having about 60 weight % with respect to the weight of carbon was coated and Pt 40% having about 40 weight % with respect to the weight of carbon was coated in the spherical porous metallic catalyst body coated with the platinum metallic catalyst. As can be seen from FIG. 5, as a result of analyzing CV peaks depending on adsorption-desorption of hydrogen, the spherical porous metallic catalyst body in accordance with the present example had an excellent electrochemically active surface property as an electrode material.

The present disclosure has been explained in detail with reference to the example as above, but the present disclosure can be modified and changed in various ways by those skilled in the art within the scope of the inventive concept described in the following claims.

What is claimed is:

1. A production method of a spherical porous carbon structure via a sacrificial template process, the production method comprising:
  using a spherical nanoparticle-carbon precursor coaggregate as a template,
  wherein the spherical nanoparticle-carbon precursor coaggregate is formed by:
    removing a solvent from a droplet including plural nanoparticles and a carbon precursor, the spherical nanoparticle-carbon precursor coaggregate including the carbon precursor on a surface of the plural nanoparticles, and
    removing the solvent to form a spherical nanoparticle coaggregate by self assembly from the plural nanoparticles included in an oil-in-water type droplet or a water-in-oil type droplet.

2. The production method of a spherical porous carbon structure of claim 1, further comprising:
  forming a spherical nanoparticle-carbon coaggregate by calcining the spherical nanoparticle-carbon precursor coaggregate in a reducing atmosphere; and
  removing the plural nanoparticles included in the spherical nanoparticle-carbon coaggregate.

3. The production method of a spherical porous carbon structure of claim 1, wherein the nanoparticle includes an inorganic particle, an organic particle, or a combination particle thereof.

4. The production method of a spherical porous carbon structure of claim 1, wherein the carbon precursor is prepared by a method including:
  a condensation polymerization reaction of a monomer selected from the group consisting of phenol-formaldehyde, phenol, furfuryl alcohol, resorcinol formaldehyde (RF), aliphatic hydrocarbon-based or aromatic hydrocarbon-based aldehydes including 1 to 20 carbon atoms, sucrose, glucose, xylose, and their combinations by using an acidic catalyst or a basic catalyst; or
  an addition polymerization reaction of a monomer selected from the group consisting of divinylbenzene, acrylonitrile, vinylchloride, vinylacetate, styrene, methacrylate, methylmethacrylate, ethyleneglycol, dimethacrylate, urea, melamin, $CH_2$=CRR' (for which R and R' are independently represent an alkyl group or an aryl group including 1 to 20 carbon atoms, respectively), and their combinations by using a polymerization initiator.

5. The production method of a spherical porous carbon structure of claim 1, further comprising:
  permeating the carbon precursor to pores of the spherical nanoparticle coaggregate, and
  forming the carbon precursor from the surface of a nanoparticle at the core of the spherical nanoparticle coaggregate.

6. The production method of a spherical porous carbon structure of claim 1, wherein an oil phase of the oil-in-water type droplet or the water-in-oil type droplet includes an aliphatic hydrocarbon-based organic solvent or an aromatic hydrocarbon-based organic solvent.

7. The production method of a spherical porous carbon structure of claim 1, wherein the spherical nanoparticle-carbon precursor coaggregate is formed by adjusting the size of the nanoparticle and/or the quantity of carbon precursor included in the droplet, in which the carbon precursor is included from a surface of nanoparticle at the core of the spherical nanoparticle-carbon precursor coaggregate to a surface of nanoparticle at the exterior of the spherical nanoparticle-carbon precursor coaggregate.

8. The production method of a spherical porous carbon structure of claim 2, wherein the removing of the nanoparticles included in the spherical nanoparticle-carbon coaggregate includes removing the nanoparticles by dissolution.

9. A spherical porous carbon structure produced by claim 1, wherein the spherical porous carbon structure includes an inverse opal structure.

10. The spherical porous carbon structure of claim 9, wherein the spherical porous carbon structure includes a three-dimensional pore assembly.

11. The spherical porous carbon structure of claim 9, wherein pores in the spherical porous carbon structure are connected to one another.

12. The spherical porous carbon structure of claim 9, wherein a pore in the spherical porous carbon structure has a size of from about 100 nm to about 1 µm.

13. The spherical porous carbon structure of claim 9, wherein the spherical porous carbon structure has a size of from about 1 µm to about 100 µm.

14. A spherical porous metallic catalyst body comprising the spherical porous carbon structure of claim 9, including a metal particle or a metal coating layer.

15. The spherical porous metallic catalyst body of claim 14, wherein the metal particle or the metal coating layer includes one or more metals selected from the group consisting of Pt, Ru, Rh, Os, Ir, Re, Co, Ni, Ti, Cu, Zr, Sr, Zn, In, Yr, La, V, Mo, W, Sn, Nb, Mg, Al, Y, Sc, Sm, Pd, and Ga.

16. A fuel cell comprising the spherical porous metallic catalyst body of claim 14.

* * * * *